United States Patent
Lee et al.

(10) Patent No.: US 9,307,161 B2
(45) Date of Patent: Apr. 5, 2016

(54) SYSTEM AND METHOD FOR CAPTURING DIGITAL IMAGES USING MULTIPLE SHORT EXPOSURES

(71) Applicant: QUALCOMM Incorporated, San Diego, CA (US)

(72) Inventors: Ji Soo Lee, San Diego, CA (US); Jiafu Luo, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 14/152,888

(22) Filed: Jan. 10, 2014

(65) Prior Publication Data
US 2015/0201118 A1 Jul. 16, 2015

(51) Int. Cl.
*H04N 5/374* (2011.01)
*H04N 5/355* (2011.01)
*H04N 5/235* (2006.01)
*H04N 5/353* (2011.01)
*H04N 5/3745* (2011.01)

(52) U.S. Cl.
CPC ........... *H04N 5/2355* (2013.01); *H04N 5/3532* (2013.01); *H04N 5/3535* (2013.01); *H04N 5/374* (2013.01); *H04N 5/3745* (2013.01); *H04N 5/35554* (2013.01); *H04N 5/35581* (2013.01)

(58) Field of Classification Search
CPC .. H04N 5/2355; H04N 5/374; H04N 5/35581
USPC ..................... 348/218.1, 222.1, 239
See application file for complete search history.

(56) References Cited

U.S. PATENT DOCUMENTS

| | | | |
|---|---|---|---|
| 8,305,468 B2 | 11/2012 | Sambongi | |
| 2011/0063483 A1 | 3/2011 | Rossi et al. | |
| 2011/0069189 A1* | 3/2011 | Venkataraman et al. | 348/218.1 |
| 2012/0188392 A1* | 7/2012 | Smith | 348/222.1 |
| 2012/0257079 A1 | 10/2012 | Ninan et al. | |
| 2012/0274822 A1 | 11/2012 | Smith et al. | |
| 2013/0016253 A1* | 1/2013 | Kobayashi | 348/239 |
| 2013/0136364 A1 | 5/2013 | Kobayashi | |

FOREIGN PATENT DOCUMENTS

| WO | WO-2011053678 A1 | 5/2011 |
|---|---|---|
| WO | WO-2012113459 A1 | 8/2012 |

OTHER PUBLICATIONS

International Search Report and Written Opinion—PCT/US2015/010317—ISA/EPO—Mar. 20, 2015.

* cited by examiner

*Primary Examiner* — Gevell Selby
(74) *Attorney, Agent, or Firm* — Knobbe, Martens, Olson & Bear, LLP

(57) ABSTRACT

Methods, devices, and computer program products for image sensors with overlapped exposure brackets supporting multiple short exposures are described. In one aspect, a method of capturing an image is disclosed. The method includes capturing, on a first subset of pixels on an image sensor, a first image with a first exposure length. The method further includes simultaneously capturing, on a second subset of pixels on an image sensor, a plurality of images with a second exposure length, wherein the second exposure length is shorter than the first exposure length. The method further includes combining the plurality of images with a second exposure length into a second image. Finally, the method includes combining the first image and the second image.

18 Claims, 14 Drawing Sheets

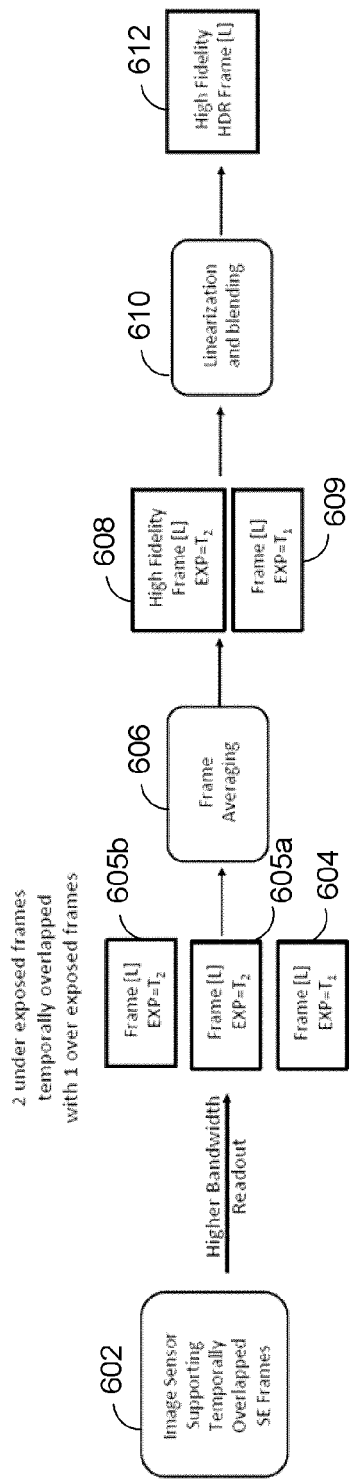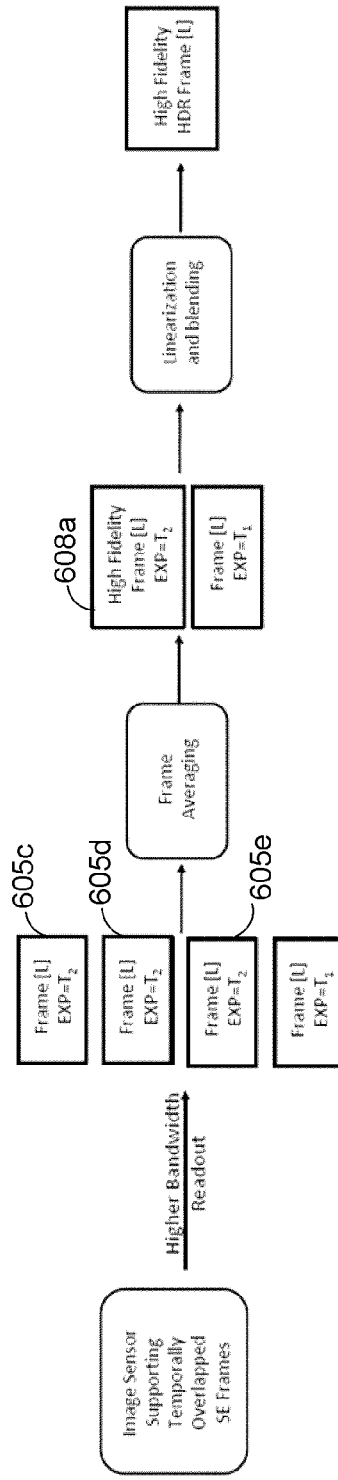
FIG. 6A
FIG. 6B

SYSTEM AND METHOD FOR CAPTURING DIGITAL IMAGES USING MULTIPLE SHORT EXPOSURES

FIELD

The present application relates generally to digital imaging, and more specifically to systems, methods, and devices for image sensors with overlapped exposure brackets supporting multiple short exposures.

BACKGROUND

In digital imaging, the dynamic range of a complementary metal-oxide-semiconductor (CMOS) sensor may, at times, be insufficient to accurately represent outdoor scenes in a single image. This may be especially true in the more compact sensors which may be used in mobile devices, such as in the camera on a mobile telephone. For example, a typical sensor used in a mobile device camera may have a dynamic range of approximately 60-70 dB. However, a typical natural outdoor scene can easily cover a contrast range of 100 dB between brighter areas and areas with shadows. Because this dynamic range is greater than the dynamic range of a typical sensor used in a mobile device, detail may be lost in images captured by mobile devices.

One method which has been used to compensate for this lack of dynamic range is to combine two or more frames into a single image with a higher dynamic range. For example, two of more frames with different exposure lengths may be combined into a single image. However, one problem with previous techniques for combining multiple frames has been a signal-to-noise ratio discontinuity between frames of different exposure lengths. One method which may be used to demonstrate this problem is to capture a grey ramp test chart using multiple exposures. In the portion of the grey ramp test chart corresponding to a transition point between two successive frame exposures, higher levels of luma and chroma noise may be observed. Such noise discontinuity may negatively affect image quality.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include robust estimation of color-dependent measurements.

In some aspects, a method of capturing a high dynamic range image is described. The method includes capturing, on a first subset of pixels on an image sensor, a first image with a first exposure length. The method further includes capturing, on a second subset of pixels on the image sensor, a plurality of images with a second exposure length, wherein the second exposure length is shorter than the first exposure length. The method further includes combining the plurality of images with a second exposure length into a second image and combining the first image and the second image to form a high dynamic range image. In some aspects, the first subset of pixels may be a first plurality of pixel lines of a pixel array and the second subset of pixels may be a second plurality of pixel lines of a pixel array. In some aspects, the first plurality of pixel lines and the second plurality of pixel lines may be interlaced with each other. In some aspects, the plurality of images may comprise two or three images. In some aspects, the plurality of images may be captures sequentially during the capture of the first image.

In some aspects, an electronic device for capturing a high dynamic range image is disclosed. The device comprises a CMOS visible image sensor comprising a plurality of pixels including a first subset of pixels and a second subset of pixels. The device further comprises a processor configured to capture, on the first subset of pixels, a first image with a first exposure length; capture, on a second subset of pixels, a plurality of images with a second exposure length, wherein the second exposure length is shorter than the first exposure length; combine the plurality of images with a second exposure length into a second image; and combine the first image and the second image to form a high dynamic range image.

In some aspects, an electronic device for capturing a high dynamic range image is disclosed. The device comprises means for capturing, on a first subset of pixels on an image sensor, a first image with a first exposure length; means for simultaneously capturing, on a second subset of pixels on an image sensor, a plurality of images with a second exposure length, wherein the second exposure length is shorter than the first exposure length; means for combining the plurality of images with a second exposure length into a second image; and means for combining the first image and the second image to form a high dynamic range image.

BRIEF DESCRIPTION OF THE DRAWINGS

FIG. 6A is an illustration of a proposed method of frame stacking multiple short exposure frames to generate a higher fidelity frame.

FIG. 6B is an illustration of a proposed method of frame stacking three short exposure frames to generate a higher fidelity frame.

DETAILED DESCRIPTION

Embodiments relate to systems, methods, and devices for using image sensors to capture digital images with overlapped exposure brackets supporting multiple short exposures. In one method, an image sensor may be configured to simultaneously capture a first image with a relatively longer exposure length, and two or more second images with relatively shorter exposure lengths. These multiple second images with a shorter exposure length may be combined into a single shorter exposure length frame, which may then be combined with the first longer exposure image. Such a combination may allow for a high dynamic range (HDR) image, with smaller signal-to-noise ratio (SNR) discontinuities than other techniques. Such an imaging system may also allow for reduced amounts of motion blur compared to other techniques for capturing an HDR image.

Figure 1:
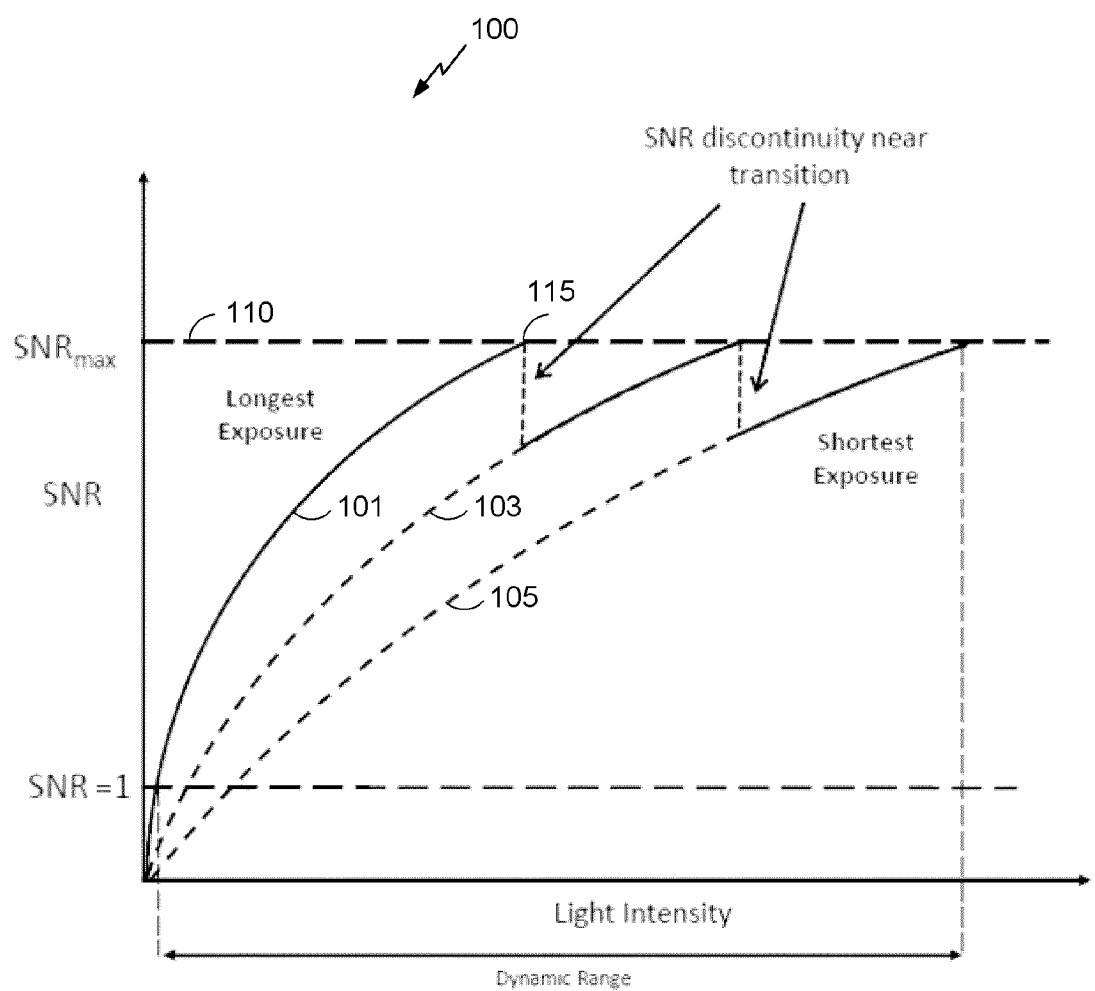
FIG. 1 is an illustration of signal-to-noise ratio discontinuities which may occur when multiple frames are combined into a single image.

FIG. 1 is a graph 100 of signal-to-noise ratio discontinuities which may occur when multiple frames are combined into a single image. For example, an image may be made up of a first frame 101, a second frame 103, and a third frame 105. Each of these three frames may have a different exposure length.

For a given image sensor, there may be a maximum attainable signal-to-noise ratio (SNR), SNRmax 110. For example, the best SNR may be obtained as the image sensor reaches its well capacity. For any given light intensity, the single image may be based primarily on image information received from the frame which has the highest SNR, but has not reached full-well capacity. For example, the first frame 101 may have the longest exposure length, and thus, the highest SNR at lower levels of light intensity, as the first frame 101 may be constructed by sensors which have received the most light. However, at higher levels of light intensity, the first frame 101 may reach its full-well capacity and become saturated, and thus, details in such brighter areas may be lost, and the readouts from the second frame 103 or third frame 105 may be used instead. However, the SNR of each frame at a given light intensity may be different than the SNR of the other frames at the same light intensity, as each frame will have received differing levels of light.

Accordingly, when three frames of different exposure lengths are combined, there may be two SNR transition points. For example, at transition point 115, pixels with a light intensity less than this value may be based primarily on image information from the first frame 101, while pixels with a light intensity above this value may be based on image information from the second frame 103. In some aspects, transition point 115 may represent a level of light at which a frame with a longer exposure length, such as the first frame 101, reaches a full-well capacity. As illustrated in graph 100, at this transition point 115, there may be a large SNR discontinuity, such that pixels with a light intensity of less than transition point 115 exhibit a high SNR, while pixels with a light intensity of more than transition point 115 exhibit a much lower SNR.

Figure 2A:
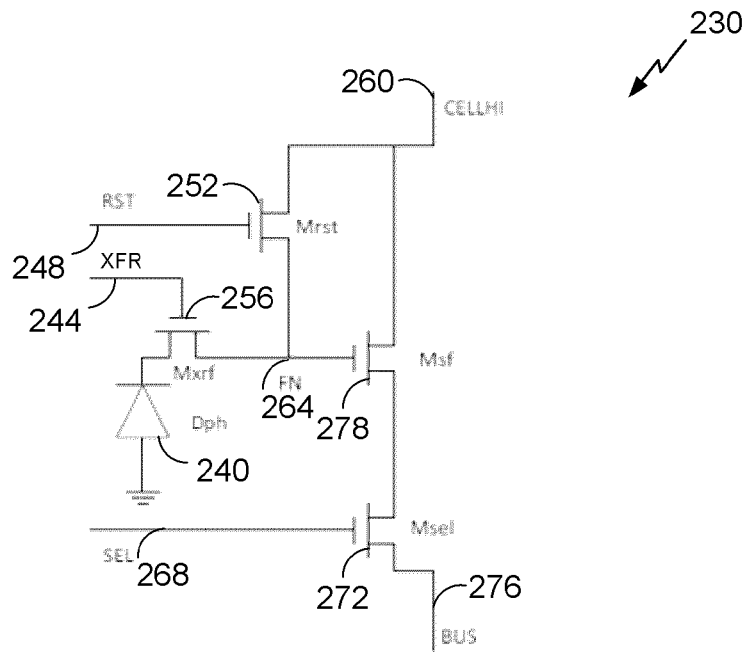
FIG. 2A is an illustration of a pixel which may be used to capture an image.

FIG. 2A is an illustration 230 of a pixel which may be used to capture an image. A pixel as illustrated in the illustration 230 may be referred to as a four-transistor (4T) pixel, as it has four transistors in each pixel. In this pixel, incoming photons are converted to electron and hole pairs in a silicon substrate. The photo-electrons are then collected by photodiode, Dph 240. In the beginning of integration, both RST 248 and XFR 244 are high for a certain amount of time, turning on both transistors Mrst 252 and MXFR 256. With CELLHI 260 being the supply voltage, this empties all electrons in photodiode Dph 240 and sets Dph 240 to a predefined voltage. Once XFR 244 is low, MXFR 256 turns off and Dph 240 starts collecting photo-electrons and its voltage goes down. In general, the rate of such photo-electron accumulation is proportional to the amount of incoming light shining on the pixel. At the end of integration, typically a so-called correlated double sampling (CDS) operation is employed to read out the accumulated charge: first Mrst 252 is turned on and off by setting RST 248 to a high value for a short time, which sets the floating node 264 (FN) to a reset voltage. The SEL 268 signal is then set high, turning on Msel 272 to enable pixel readout. In some aspects, SEL 268 may also be set high when RST 248 is set to a high value. If BUS 276 is connected to a current source, then Msf 278 acts as a source follower, resulting in BUS 276 voltage tracking the voltage of FN 264. Once the reset voltage of FN 264 has been readout, MXFR 256 is turned on, dumping all collected photo-electrons in Dph 240 to FN 264, thus reducing the voltage of FN 264. After this, BUS 276 voltage will follow the reduced voltage of FN 264 and a second readout is performed through the source follower. The difference between the two readouts gives the voltage change on node FN 264 due to photo-electrons collected by Dph 240. CDS operation in general reduces certain temporal noises and the impact of transistor variation. The time difference between two XFR 244 pulses, one for reset and one for readout, is the integration time of the pixel.

Figure 2B:
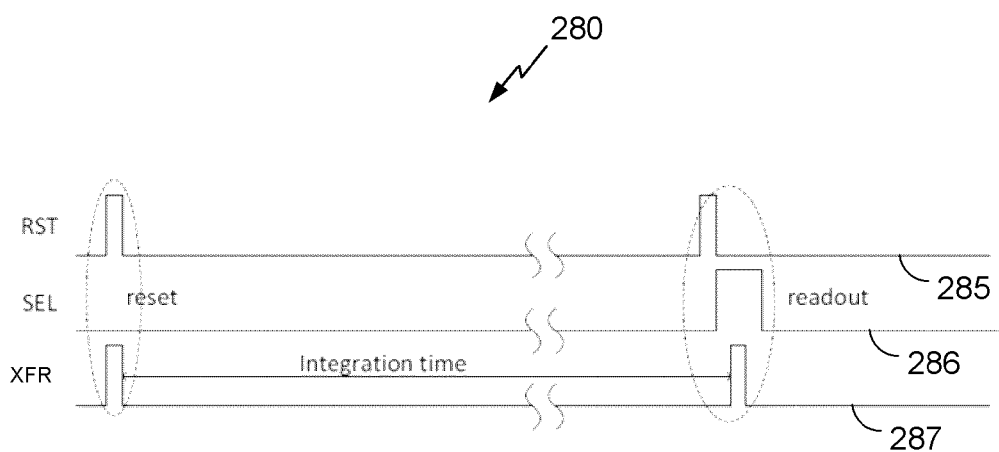
FIG. 2B is an illustration of buses which may be shared by a number of pixels.

FIG. 2B is an illustration 280 of buses which may be shared by a number of pixels. Generally, for a pixel array which contains a large number, often millions, of pixels, it is not possible to connect to all of the different control signals in FIG. 2A individually. Instead, SEL 285, RST 286, and XFR 287 are horizontal buses which may be shared by one row of pixels, while BUS is a vertical bus shared by one column of pixels. In the illustration 280, CELLHI (such as CELLHI 260 of FIG. 2A) itself may be the same for each pixel in the array, and therefore can be either a horizontal or a vertical bus. Because of this implementation wherein SEL 285, RST 286, and XFR 287 are horizontal buses, each pixel in a row may have the same integration time.

Figure 2C:
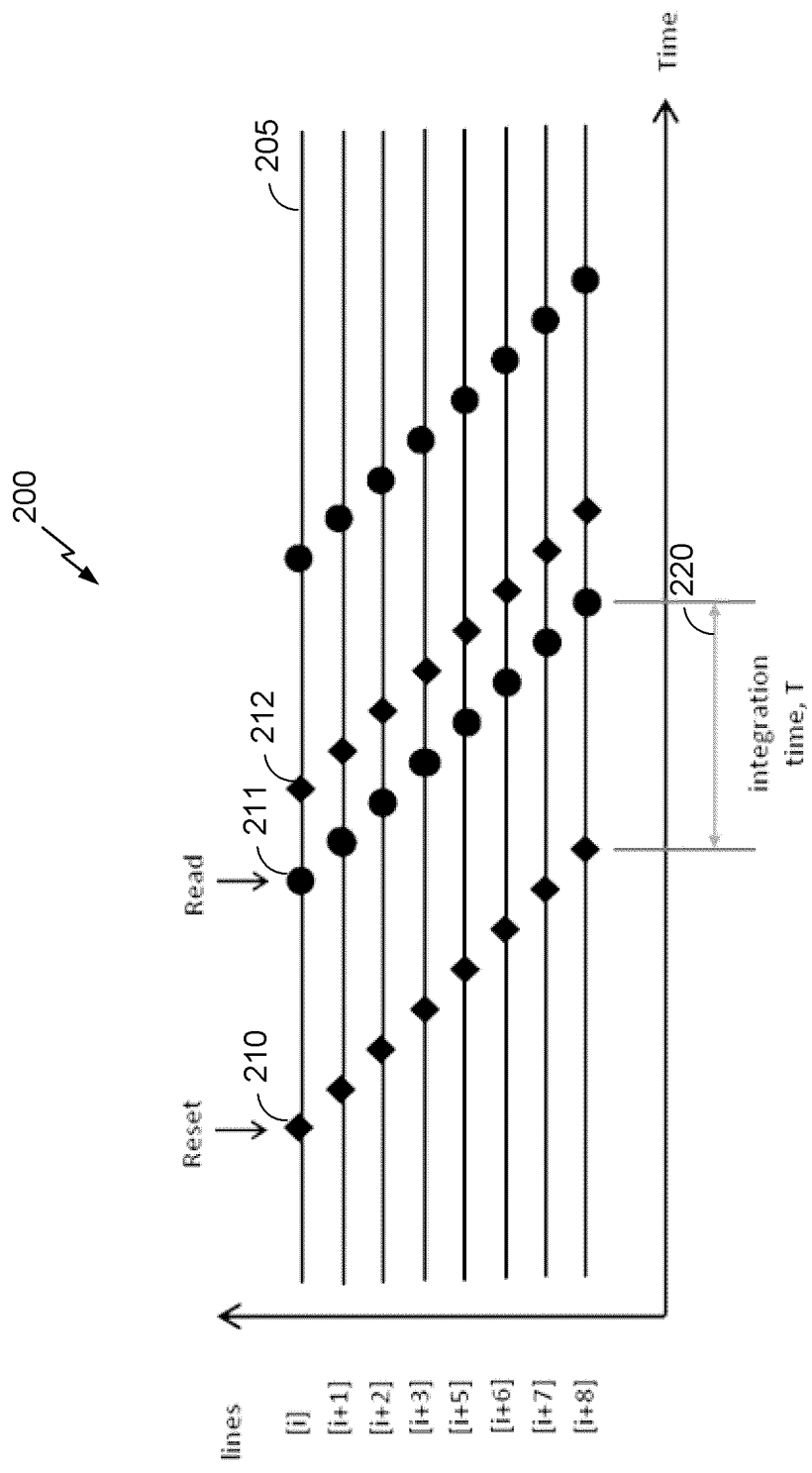
FIG. 2C is a timing diagram which may be used on an image sensor array in order to capture an image.

FIG. 2C is a timing diagram 200 which may be used on an image sensor array in order to capture an image. For example, the image sensor array may contain a number of lines, numbered i, i+1, i+2, and so on. At a time 210, image sensors on the first line i 205 may be reset, and thus may begin to collect incoming light. After an integration time T 220, at a time 211, image sensors on the first line i 205 may be read. That is, at time 211, it may be determined how much light image sensors on the first line i 205 have received since their last reset, at time 210. The information captured from the image sensors on the first line i 205 between time 210 and time 211 may be used as part of a first frame. After this, the image sensors on the first line i 205 may be reset at time 212, in order to begin a capture for a subsequent frame. As illustrated in timing diagram 200, each line may be similarly reset and read, with each readout occurring after the same integration time T 220 on each given line. Accordingly, timings based upon this timing diagram may be used to capture a number of frames, each with the same exposure length.

However, one disadvantage of such a timing is that it may only be able to capture images with a single exposure length. Thus, it may not be possible to use such a timing diagram for an HDR image. In order to create an HDR image, a readout based on timing diagram 200 may be used, in which a longer-exposure frame is taken for the first frame, and a relatively shorter exposure frame is taken as a second frame. These frames may then be combined. However, one drawback of such an approach is that the two frames will be taken at different times, rather than simultaneously. Thus, if a subject of the photograph is moving, this may create a blurry image or ghosting, as the moving subject may be in a different location in the longer- and the shorter-exposure frames.

Figure 2D:
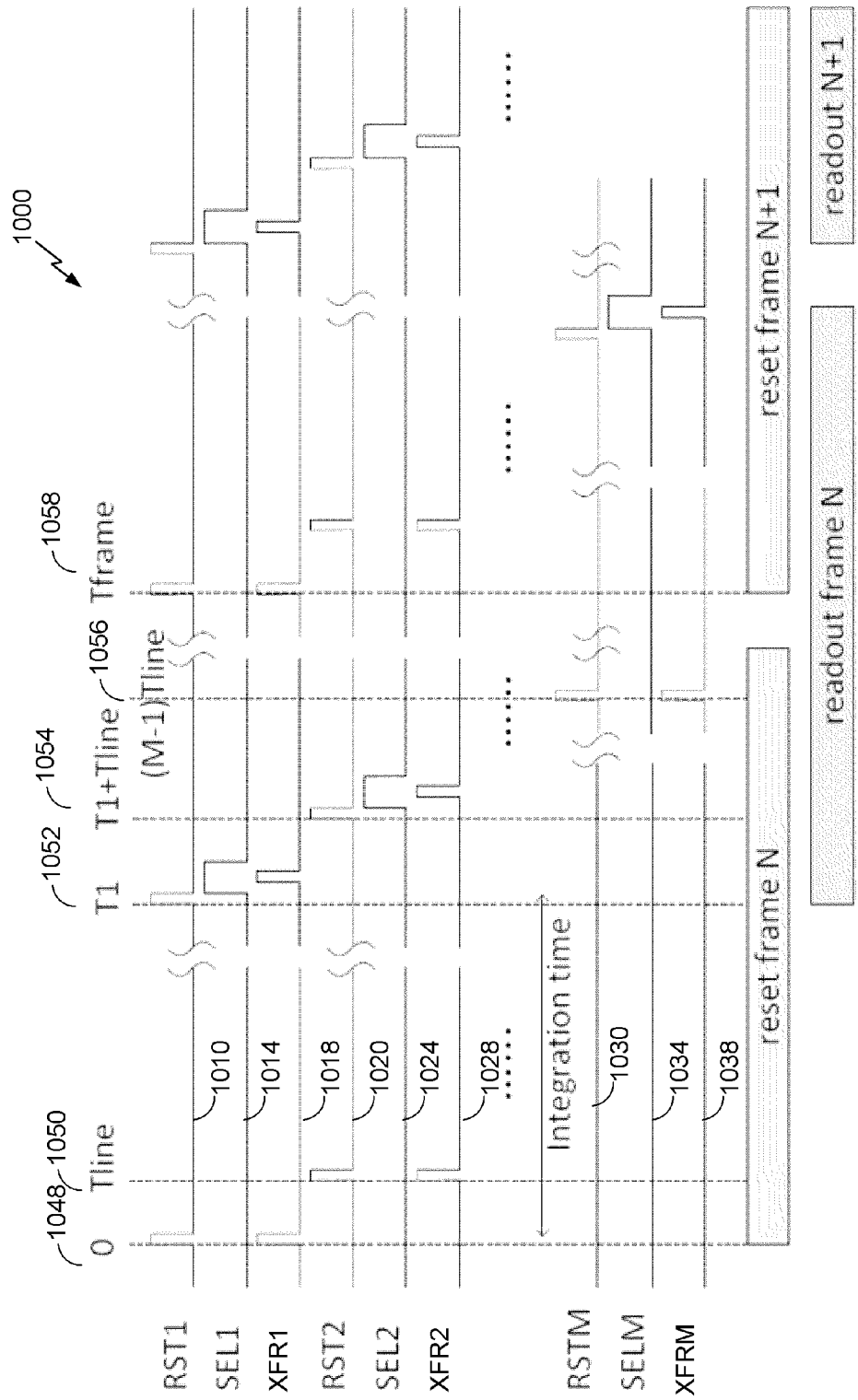
FIG. 2D is an illustration of a timing diagram for a rolling shutter operation for a conventional image sensor.

FIG. 2D is an illustration 1000 of a timing diagram for a rolling shutter operation for a conventional image sensor. This illustration 1000 shows the timings of various pulses, when a sensor is used as illustrated in illustration 200 of FIG. 2C. This illustration 1000 illustrates the timings which may be used to an array with M rows of pixels. First, at time zero 1048, integration of the first row may begin by turning on both RST1 and XFR1 for a short time. Because of this, all photodiodes in the first row will be set to the pinning voltage of the photodiode. At time Tline 1050, a similar sequence is repeated to reset row 2, followed by row 3 at time 2*Tline, and so on. This continues until last row, row M, is reset at time (M−1)*Tline 1056. Assuming an integration time of T1, at time T1 1052, row 1 will be readout. This involves turning on & off RST1 1010 to reset floating nodes, turning on SEL1 1014 to readout reset level, turning on & off XFR1 1018 to dump charges from photodiodes to floating nodes, and then reading out signal level to perform CDS. One line time later, at T1+Tline 1054, row 2 will be read out using the same procedure, as described above. This continues until each row is read out. Since each pixel has two operation sequences during the capture of an image: reset and readout, we can think of each picture frame as consisting of two different frames: a reset frame and a readout frame. For the frame discussed above, frame N, its reset frame starts at time zero 1048 and ends at time M*Tline and its readout frame starts at time T1 1052 and ends at T1+M*Tline. Once row 1 has finished readout of frame N, it can now be reset to start integration of frame N+1. The time at which frame N+1 begins to be reset may depend on the frame time, Tframe 1058, and whether the integration time for a frame may change between frame N and frame N+1. If the integration time of frame N+1 is the same as that of frame N, then frame N+1 may be reset at time Tframe 1058, and the sequence described above may be repeated. Based on this diagram, it may be observed that reset frames will not overlap each other, and readout frames will not overlap each other. However, a reset frame may overlap the previous readout frame.

Figure 3A:
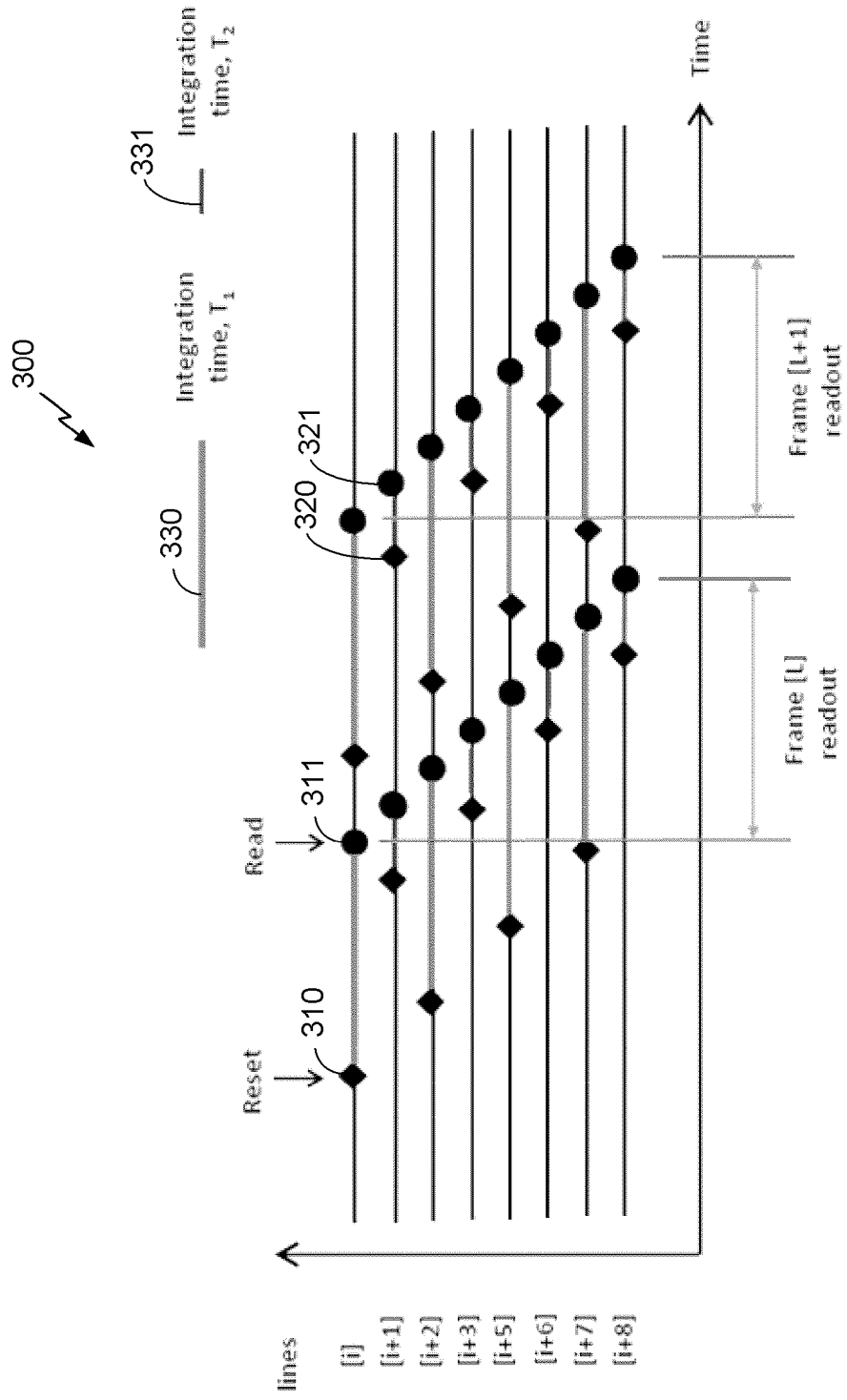
FIG. 3A is a timing diagram which may be used on an image sensor array in order to capture an HDR image.

FIG. 3A is a timing diagram 300 which may be used on an image sensor array in order to capture an HDR image. In timing diagram 300, the even-numbered lines act just as all the lines in timing diagram 200 did. That is, each of these lines resets 310 and reads 311 after an integration time T1 330, just as each line in illustration 200 of FIG. 2C reset 210 and read 211 after an integration time T.

However, in timing diagram 300, the odd-numbered lines may be reset 320 and may be read 321 after integration time T2 331. Integration time T2 331 may be a shorter time than integration time T1 330. Accordingly, the even-numbered lines may be combined to construct an image with an integration time T1 330. Similarly, the odd-numbered lines may be combined to construct an image with an integration time T2 331. These two images may be combined into a single image in order to form an HDR image.

This approach may offer both advantages and disadvantages over the approach in timing diagram 200 of FIG. 2C. For example, this approach may allow for the construction of an HDR image. Additionally, unlike an HDR image that might be constructed using sequential longer- and shorter-exposure frames, the two frames in an HDR image formed using the timing diagram 300 are captured almost simultaneously. One advantage of the two frames being captured simultaneously is that moving objects may be in more similar locations in both the shorter-exposure and the longer-exposure image. This may reduce blurriness in the combined images, and may also reduce ghosting in the combined image. One trade-off for the timing diagram 300 is that the vertical resolution of such a combined image may be half the vertical resolution of an image captures using timing diagram 200. For example, each of the longer- and the shorter-exposure images may use only half of the lines of the array. Thus, the vertical resolution of each of the images may be half as much as an image that uses the full array. However, such a loss of resolution may be less of a concern as image sensors include a larger number of lines, as such a loss of vertical resolution may be seen as a worthwhile tradeoff, in order to capture HDR images with less blurriness and ghosting. The shorter-exposure frames may have an exposure length that is based on the exposure length of the longer-exposure frames. For example, a shorter-exposure frame may have an exposure length that is approximately 10%, 20%, 25%, 33%, 50% or some other proportion of the exposure length of the longer-exposure frame. In some aspects, the exposure length of the longer-exposure frame may be based upon the amount of light that is present in a scene. For example, the exposure length of the longer-exposure frame may be configured to be a length in which a certain proportion of the pixels of the capture device reach full-well capacity. For example, this proportion may be 5% of the pixels, 10%, 20%, or another proportion of the pixels of the capture device. In some aspects, the length of the shorter-exposure frame may be based on the length of the longer-exposure frame, based on the amount of light that is present in a scene, or based on other factors.

Figure 3B:
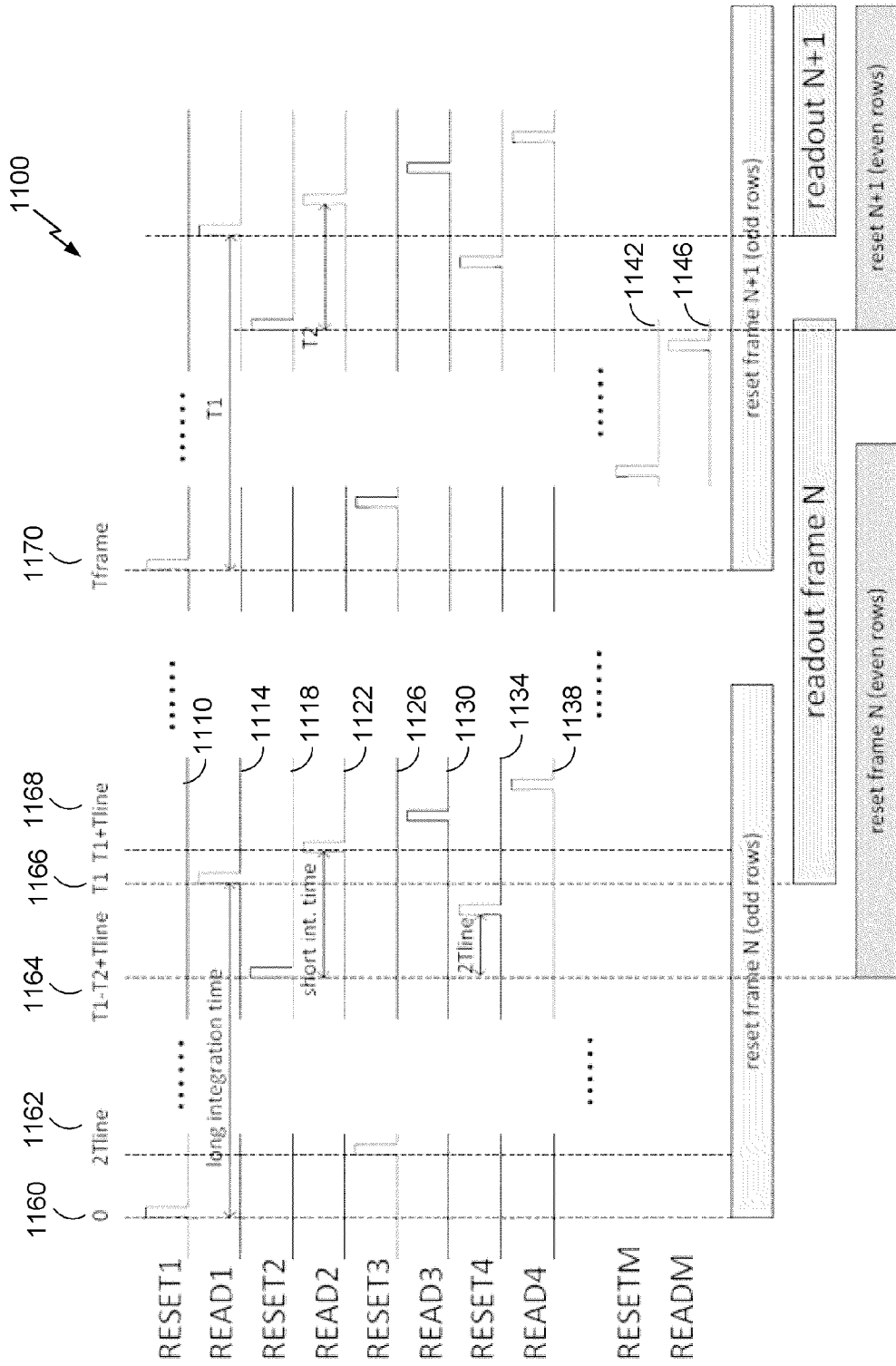
FIG. 3B is an illustration of a timing diagram for a rolling shutter operation for an image sensor to capture an HDR image.

FIG. 3B is an illustration 1100 of a timing diagram for a rolling shutter operation for an image sensor to capture an HDR image. For example, this timing diagram may correspond to a timing embodiment such as that illustrated timing diagram 300 of FIG. 3A. As described above, one technique to increase dynamic range of an image is to use two different integration times for the odd rows and for the even rows of an image. For example, the odd rows may have a longer integration time, T1, allowing them to show more detail in dark areas, while the even rows may have a shorter integration time, T2, which allows them to show more detail in bright areas. For video mode applications, it may be beneficial to do so inside the same frame. In order to simplify this diagram, each row does not display individual signals, but instead shows only a "read" and a "reset" pulse. At time zero 1160, the first line is reset by doing the RESET1 1110 operation. At time 2*Tline 1162, line 3 will be reset using a RESET3 1126 operation. At time Tline, a conventional imager would reset line 2. However, in this imager, line 2 is a shorter-exposure line, and thus does not need to be reset until later. However, line 2 is not reset until time T1−T2+Tline 1164, using a RESET2 1114 operation. This timing is determined in order to allow each line, including those with exposure time T1 and those with exposure time T2, to be read out in evenly-spaced intervals of Tline, as in illustration 1100. For example, line 1 will be readout using a READ1 1114 operation at time T1 1166. Following this, line 2 will be readout using a READ2 1122 operation at time T1+Tline 1168. This procedure will continue until the last line of the M line array.

In illustration 1100, it may be observed that while the readout frame remains the same as in illustration 1000 of FIG. 2D, with each row being read out sequentially, the reset frame is split into two different frames—one for the odd rows and one for the even rows. As in illustration 1000, there is no overlap between consecutive readout frames. However, there may be overlap between reset frames and readout frames, or overlap between even- and odd-row reset frames. Indeed, pixels from two different rows, such as an even row and an odd row, may be reset at the same time. Such simultaneous resets will require that the common CELLHI bus has enough driving capability. However, this may not be problematic, as the reset of a pixel row many not consume much power. This illustration 1100 may work for a black-and-white pixel, and may easily be adapted for a color array. For example, in a color image sensor with a 2×2 Bayer CFA pattern, each row in illustration 1100 may be expanded to two rows, in order to match the Bayer pattern. Accordingly, there would be reset frames for odd pairs of rows and different reset frames for even pairs of rows.

In some aspects, however, it may be beneficial to use multiple short-exposure frames for each long-exposure frame. The multiple short-exposure frames may be combined together, and this combined frame may increase the SNR of the combined frame. Accordingly, a pixel array readout scheme which leads to multiple short exposure frames for each and every long-exposure frame may be beneficial. These short-exposure frames may be read out from the sensor, and then averaged to generate a high-fidelity short exposure frame.

Figure 4A:
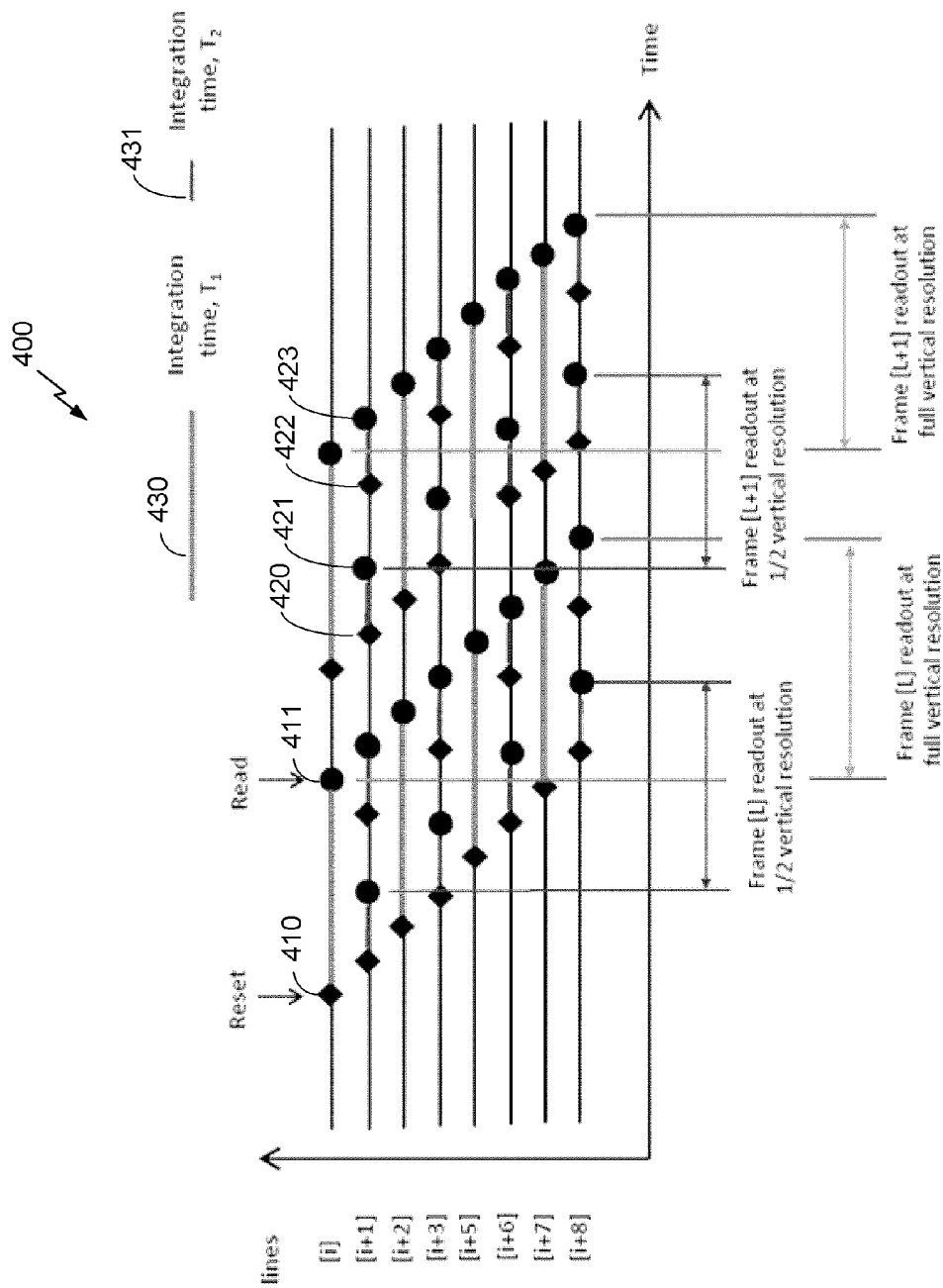
FIG. 4A is a timing diagram which may be used on an image sensor array in order to capture an HDR image using multiple short-exposure frames.

FIG. 4A is a timing diagram 400 which may be used on an image sensor array in order to capture an HDR image using multiple short-exposure frames. Timing diagram 400 is similar in a number of respects to timing diagram 300, however, one important difference is that timing diagram 400 captures multiple short-exposure frames during a single long-exposure frame. As in timing diagram 300 of FIG. 3A, a longer-exposure frame may be captured on the even-numbered lines of an array of pixels. A reset 410 may occur on the first line, followed by a read 411 operation, after the integration time T1 430. However, while in timing diagram 300 a single short-exposure frame was taken during the integration time T1 430, in timing diagram 400, two short-exposure frames may be taken during the integration time T1 430.

For example, on line i+1, a reset 420 may occur followed by a read 421 after integration time T2 431. After this, another reset 422 may be followed by another read 423. The timing may be followed on each odd-numbered line. These two shorter-exposure frames may then be combined together, such as by averaging or using other techniques, including techniques for minimizing motion blur. The combined shorter-exposure frame may then be combined with the longer-exposure frame which is captured simultaneously on the even-numbered lines. By using two or more short-exposure frames in the combined HDR image, SNR discontinuity may be reduced, as the combined shorter-exposure frame may have a higher SNR than each of the individual shorter-exposure frames. Further, by capturing both of the shorter-exposure frames simultaneously with capturing the longer-exposure frame, motion blur and ghosting in the combined image may be reduced. As with timing diagram 300, this approach may reduce vertical resolution in the combined image. However, with a high-resolution image sensor, this loss of resolution may not be problematic.

Note that while timing diagram 400 illustrates these even-numbered lines may use integration time T1, and odd-numbered lines use integration time T2, other schemes may also be used to divide the pixels which use integration time T1 and those which use integration time T2. For example, in some aspects, the display may be configured such that half of the pixels in line i use integration time T1, and half of the pixels in line i use integration time T2. For example, while the pixels in FIG. 4A are divided based upon even and odd line numbers, other divisions may also be possible. In some aspects, it may be beneficial to instead divide the pixels of a capture device into groups based upon which column they are in. In some aspects, it may be beneficial to divide the pixels between the longer- and the shorter-integration time evenly across rows and columns. For example, the pixels may be divided into two integration times based upon a checkerboard pattern. Such a division may be advantageous, as this may result in a resolution loss in an HDR image that is more uniform in the x & y directions.

Figure 4B:
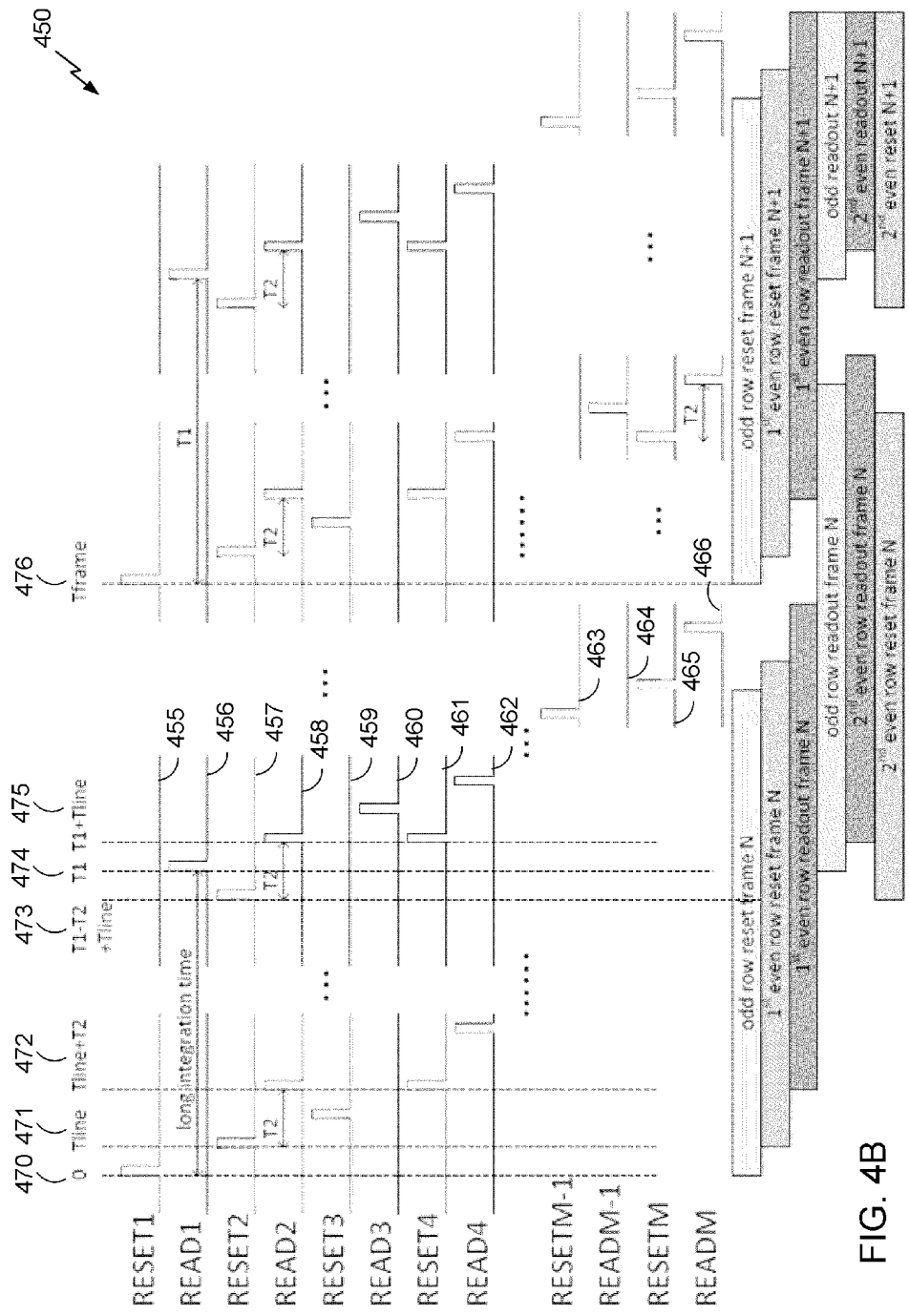
FIG. 4B is a timing diagram illustrating the timings for a rolling shutter operation for an image sensor to capture an HDR image using multiple short-exposure frames.

FIG. 4B is another timing diagram 450, illustrating the timings for a rolling shutter operation for an image sensor to capture an HDR image using multiple short-exposure frames. In this scheme, the odd rows are integrated with longer-integration time T1. However, during this time, the even rows capture two frames with shorter-integration time T2. Accordingly, there are two readout and two reset frames on even rows for every one reset and readout frame on the odd rows.

At time zero 470, frame N is reset by resetting row 1 using RESET1 455, followed by resetting row 2 using RESET2 257 at Tline 471, and so on, until each of the M rows have been reset. This is one full reset frame, which may be split into two reset frames (one odd and one even), if desired. For example, this may be referred to as both the odd row reset frame N, and the $1^{st}$ even row reset frame N. Note that the $1^{st}$ even row reset frame N does not need to be started at time Tline 471. The $1^{st}$ even row reset frame N may be started at any time during the integration time of the first long-exposure frame.

After the short integration time T2 after the reset of row 2, at time T2+Tline 472, a READ2 458 operation will be done one row 2, and then for each even row after this in order. This may be referred to as the $1^{st}$ even row readout. Accordingly, the first of the shorter-exposure frames may be captured in this way.

At time T1−T2+Tline 473, the $2^{nd}$ even row reset frame may be started. As with the $1^{st}$ even row reset, this process begins by resetting row 2, and then row 4, and so on. At time T1, a complete readout frame may begin, consisting of the odd row readout frame and $2^{nd}$ even row readout frame. These odd and even readout frames are staggered by one line time delay, thus at any line time, there is only one row being readout for this frame. Note that while the odd row readout frame and the $2^{nd}$ even row readout frame are shown to be inter-coupled, and completed at the same time, these do not need to be done at the same time. For example, just as the $1^{st}$ even row reset frame need not be coupled to the odd row reset frame, neither do the readout frames need to be coupled together as long as they are separated by an odd number of line times so that their readout won't occur at the same time. This will allow us to fully utilize the whole video frame time for T2. The only constraint regarding the timing of the $2^{nd}$ even row reset frame N is that is must begin after the $1^{st}$ even row readout frame N begins, and the $2^{nd}$ even row readout frame N must begin prior to the beginning of the $1^{st}$ even row reset frame N+1. If these conditions were not met, then a single row would be scheduled to be reset for a next frame prior to that row being read for the previous frame, which would erase the integrated signal from previous frame and result in the wrong readout. The illustrated sequence of illustration 450 may be repeated for each frame, such as a frame of video. In order to read out additional even row readout frames, faster analog readout chains need to be implemented, together with faster data output interface.

Figure 5A:
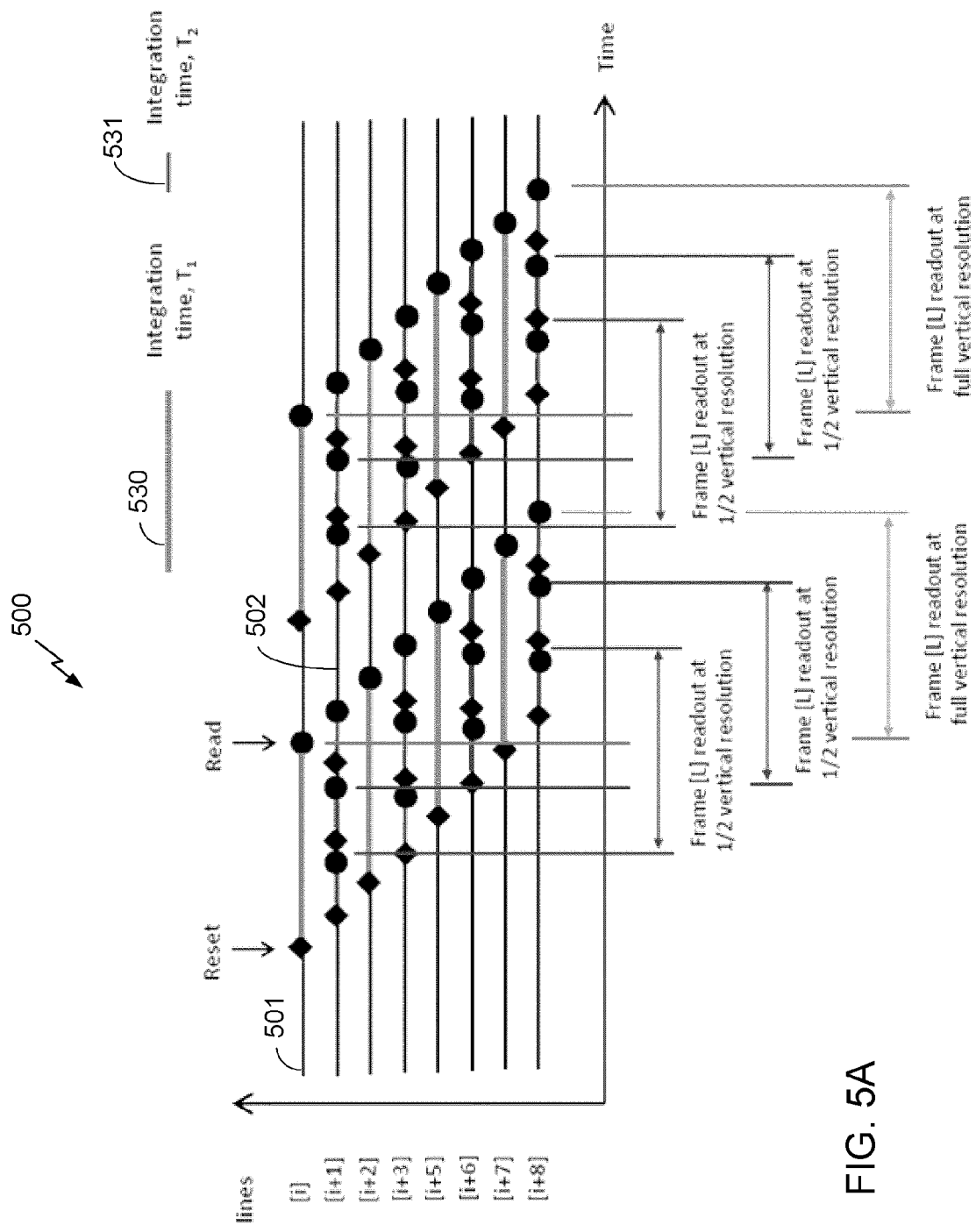
FIG. 5A is a timing diagram which may be used on an image sensor array in order to capture an HDR image using three short-exposure frames.

In some aspects, more than two shorter-exposure frames may be taken simultaneously with the longer-exposure frame. For example, FIG. 5A is a timing diagram 500 which may be used on an image sensor array in order to capture an HDR image using three short-exposure frames. In timing diagram 500, while line i 501 captures a single frame with an integration time T1 530, line i+1 502 captures three shorter-exposure frames, each with an integration time T2 531. Capturing more shorter-exposure frames may help increase the SNR in a frame made up of the combined shorter-exposure frames. For example, combining three shorter-exposure frames into a single image may result in a larger SNR than combining two shorter-exposure frames with the same exposure length. Accordingly, when such a combined image is combined with the longer-exposure frame captured on the even-numbered lines such as line i 501, SNR discontinuities in the formed image may be reduced.

Figure 5B:
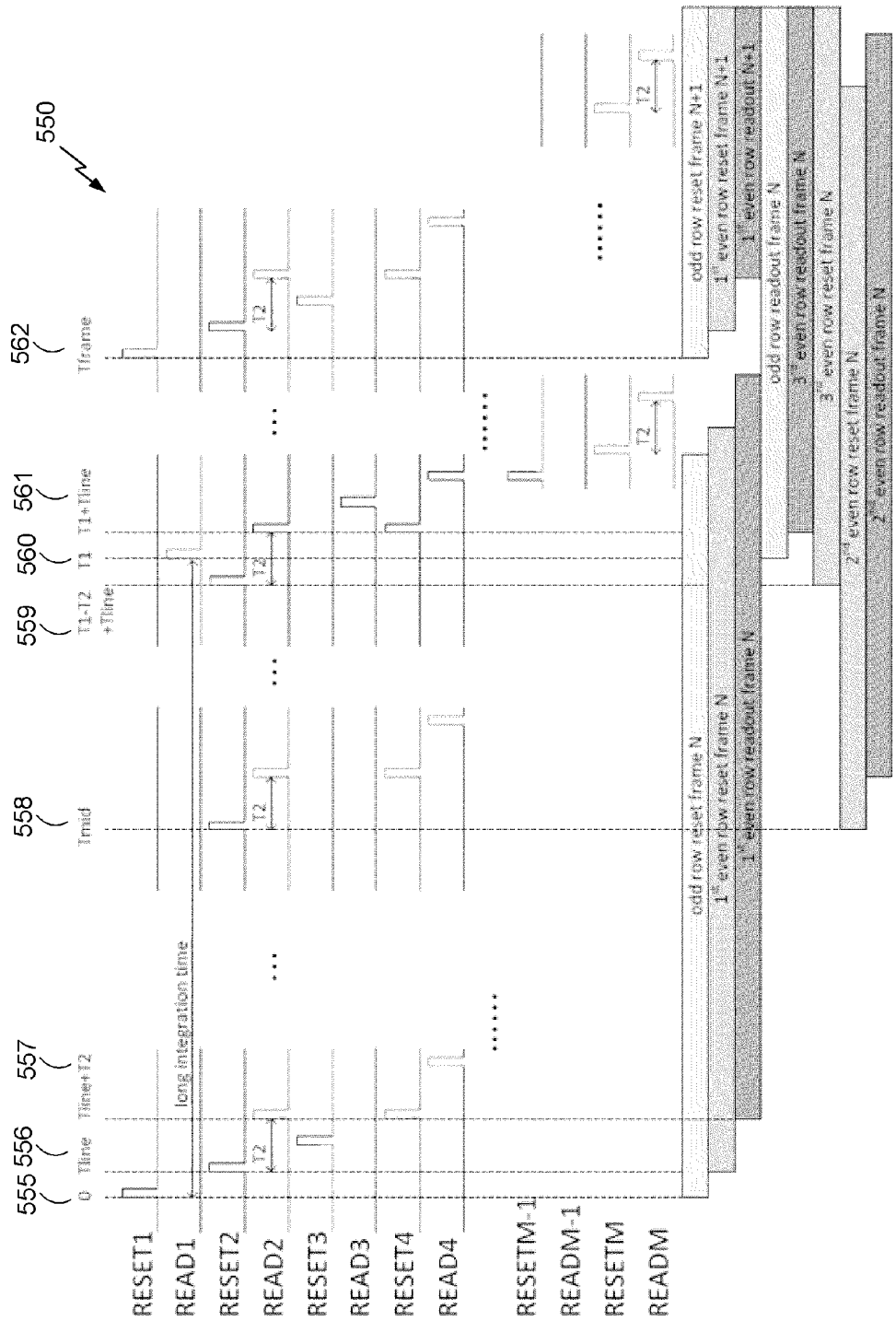
FIG. 5B illustrates a timing diagram for an image sensor array, which captures three short-exposure frames per long-exposure frame.

FIG. 5B illustrates a timing diagram 550 for an image sensor array, which captures three short-exposure frames per long-exposure frame. Timing diagram 550 is similar to timing diagram 450. However, timing diagram 550 includes an additional even row reset frame and even row readout frame during the time of the odd row reset frame. Because we can't readout two different rows at the same time, the exact readout sequence must be set up to avoid this. For example, if the odd row readout occurs at first half of each line time, we can have the last ($3^{rd}$) even row readout occurring also at first half of each line time because they are staggered by one line time delay. For example, the first row may be read out at time T1 560, while the second row may be read out at time T1+Tline 561, and so on. With that, the first two even readout rows may occurs at second half of each line time so they won't conflict with the odd row readout frame or the $3^{rd}$ even row readout frame. This means that there will be a constraint on Tmid 558, which is the spacing between the $1^{st}$ and $2^{nd}$ even row readout frames—Tmid 558 must be in such a way that these two frames are also staggered by one line time. Accordingly, Tmid 558 must be an even multiple of Tline 556, as this will prevent two lines from $1^{st}$ and $2^{nd}$ even readout frames from being read out at the same time, and will stagger line readouts by one line time, Tline 556.

While the timing described above has $1^{st}$ even row reset frame tied to the odd row reset frame and $3^{rd}$ even row readout frame tied to the odd row readout frame, following the same discussion in the previous case with two even row readout frames, we can decouple such relationship and move the even row readout/reset frame around. The only constrain is that at any time, there can only be one row being readout and the beginning of next even row reset frame cannot be ahead of the current even row readout frame.

FIG. 6A is an illustration of one method of frame stacking using multiple short exposure frames to generate a higher fidelity frame. This method may be done by a device for capturing digital images, such as a cellular telephone or a digital camera. This method may be used in conjunction with timing diagram 400 of FIG. 4A. At block 602, an image sensor supporting temporally overlapped shorter-exposure frames may capture three frames including two frames 605a, 605b with an exposure time of T2, and one frame 604 with a longer exposure time of T1. These three frames may be transmitted via a higher bandwidth readout compared to other image sensors. These three frames may be captured using an image sensor timing like that illustrated in timing diagram 400.

At block 606, the two shorter-exposure frames 605a, 605b with exposure length T2, may be combined using frame averaging 606. In some aspects, this frame averaging 606 may include taking a simple average of the pixel values of each pixel in the two frames 605a, 605b. In some aspects, frame averaging may also include certain techniques for motion compensation, such as techniques which might detect motion between the two frames and might attempt to produce a combined image with less blurriness or ghosting. In some aspects, the frame averaging 606 may include using a weighted average. Accordingly, the two shorter-exposure frames 605a, 605b may be combined into a single high fidelity frame 608, still with an exposure length T2. Because the high fidelity frame 608 is made up of two frames 605a, 605b which have been combined together, such as by frame averaging 606, the high fidelity frame 608 may have less noise than each of the two shorter-exposure frames 605a, 605b.

Finally, a high fidelity HDR frame 612 may be created by combining the high fidelity frame 608 with the longer-exposure frame 609. This combination may comprise linearizing and blinding 610 the high fidelity frame 608 with the longer-exposure frame 609. This HDR frame 612 may have a higher dynamic range than either the high fidelity frame 608 or the longer-exposure frame 609. For example, the high fidelity frame 608 may, due to its shorter-exposure length T2, lack certain details in dimly-lit areas of the image. Similarly, the longer-exposure frame 609 may lack certain details in brightly-lit areas of the image, as those areas may have reached their full-well capacity during the longer exposure length T1. However, the high fidelity HDR frame 612 may include these details in both the bright and the dim areas of the photo. Additionally, because of the higher SNR of the high fidelity frame 608, compared to a single frame with an exposure length T2, the high fidelity HDR frame 612 may have smaller SNR discontinuities than other types of HDR frame.

FIG. 6B is an illustration of a proposed method of frame stacking using three short exposure frames to generate a higher fidelity frame. This method may be done by a device for capturing digital images, such as a cellular telephone or a digital camera. This method may be used in conjunction with the timing diagram 500 illustrated in FIG. 5A. The difference between the method illustrated in FIG. 6A and that of FIG. 6B is that the method of FIG. 6B uses three shorter-exposure frames 605c, 605d, 605e, rather than two such frames. The use of additional shorter-exposure frames may further increase the SNR of the high-fidelity frame 608a. In some aspects, any number of shorter-exposure frames may be combined to form a high fidelity frame 608a. In some aspects, the more shorter-exposure frames that are used, the higher the SNR of the high fidelity frame 608a will be.

Figure 7:
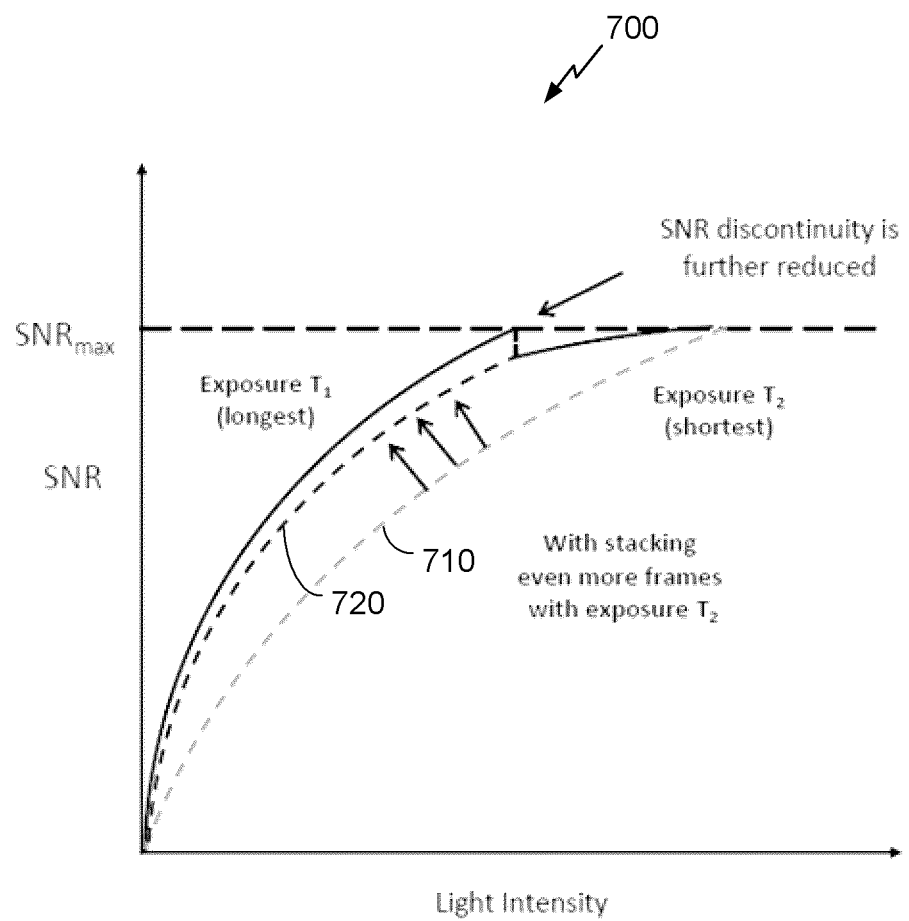
FIG. 7 illustrates the improvements in SNR which may be obtained by using additional shorter-exposure frames.

FIG. 7 illustrates the improvements in SNR which may be obtained by using additional shorter-exposure frames. For example, graph 700 illustrates an improvement in SNR from using a single shorter-exposure frame with an exposure of T2, represented by line 710, and the SNR of a frame which is constructed by stacking multiple frames with an exposure length T2, represented by line 720. As graph 700 shows, stacking additional frames with the same exposure length T2 will increase the SNR of the stacked image, as compared to an individual frame. Similarly, stacking an increasing number of frames will continue to improve SNR. However, note that adding additional frames may also increase the likelihood that moving objects may appear blurry or may exhibit ghosting. Accordingly, in some aspects, it may be desirable to stack a number of shorter-exposure frames, where the number is chosen based upon minimizing ghosting while maximizing SNR. For example, it may be desirable to stack a number of shorter-exposure frames which are all taken during the time which the longer-exposure frame is taken, such as using timings as illustrated in timing diagram 400 of FIG. 4A or timing diagram 500 of FIG. 5A.

Figure 8:
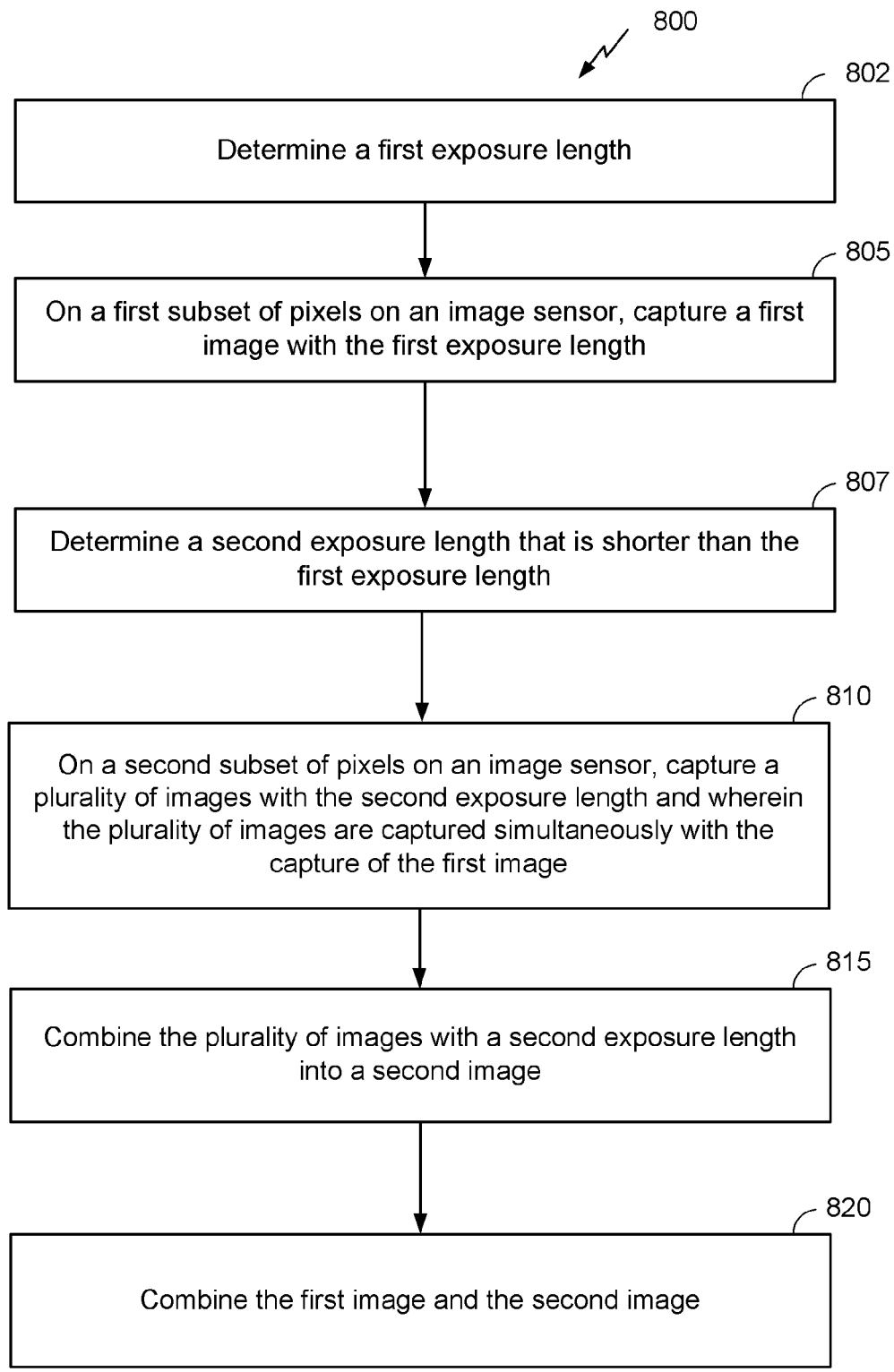
FIG. 8 is an exemplary method of capturing an image.

FIG. 8 is an exemplary method 800 of capturing an HDR image. This method may be done by a digital device, such as a digital camera, a cell phone, or another device which includes an image sensor.

At block 802, the method 800 determines a first exposure length. For example, this exposure length may be determined based upon user input, such as a user selecting an exposure length using an interface of the digital device. In some aspects, the first exposure length may be determined based, at least in part, on a light level which is found in a scene to be captured. For example, the first exposure length may be an exposure length that is configured to allow a certain proportion of the pixels of the imaging device to reach a full-range output, such as 5%, 10%, 20% or another proportion of the pixels. In some aspects, the first exposure length may be based upon an amount of movement that is detected in a given scene. The first exposure length may be based on any of the above factors, alone or in combination with each other and with other factors.

At block 805, the method 800 captures a first image with the first exposure length. This image is captured using a first subset of pixels on an image sensor. For example, the first subset of pixels may be a subset of the lines of pixels, such as the odd-numbered rows of pixels. In some aspects, the pixels may be divided into two or more subsets of pixels, such as dividing the pixels into even rows and odd rows.

At block 807, the method 800 determines a second exposure length that is shorter than the first exposure length. For example, the second exposure length may be based on the light level in the scene to be captured. The second exposure length may also be based on the first exposure length. For example, the second exposure length may be based upon some proportion of the first exposure length, such as being approximately 10%, 20%, 25%, 33%, 50% or some other proportion of the first exposure length. In some aspects, it may be beneficial to base the second exposure length on the first exposure length, in order to allow the digital device to capture a particular number of shorter-exposure frames with the second exposure length during the capture of a single longer-exposure frame with the first exposure length.

At block 810, the method 800 then captures a plurality of images with a second exposure length on a second subset of pixels on an image sensor, wherein the second exposure length is shorter than the first exposure length, and wherein the plurality of images are captured simultaneously with the capture of the first image. For example, while the first subset of pixels is capturing a first image, the second subset of pixels may capture two or more images. For example, the second subset of pixels may be the even-numbered lines of an array of pixels on an image sensor. The second subset of pixels, in some aspects, may capture, two, three, or more images during the time the first subset of pixels captures an image. Each of these images may be captured sequentially on the second subset of pixels.

At block 815, the method 800 combines the plurality of images with a second exposure length into a second image. For example, this combination may be made by using an average, or a weighted average between the images. This combined image may have less noise that each individual image of the plurality of images. At block 820, the method 800 combines the first image and the second image. This combined image may be constructed using pixel averaging, using a weighted pixel average, or other image combination techniques. In some aspects, the combined image may by an HDR image, with a higher dynamic range than either an image with the first exposure length, or an image with the second exposure length.

Figure 9:
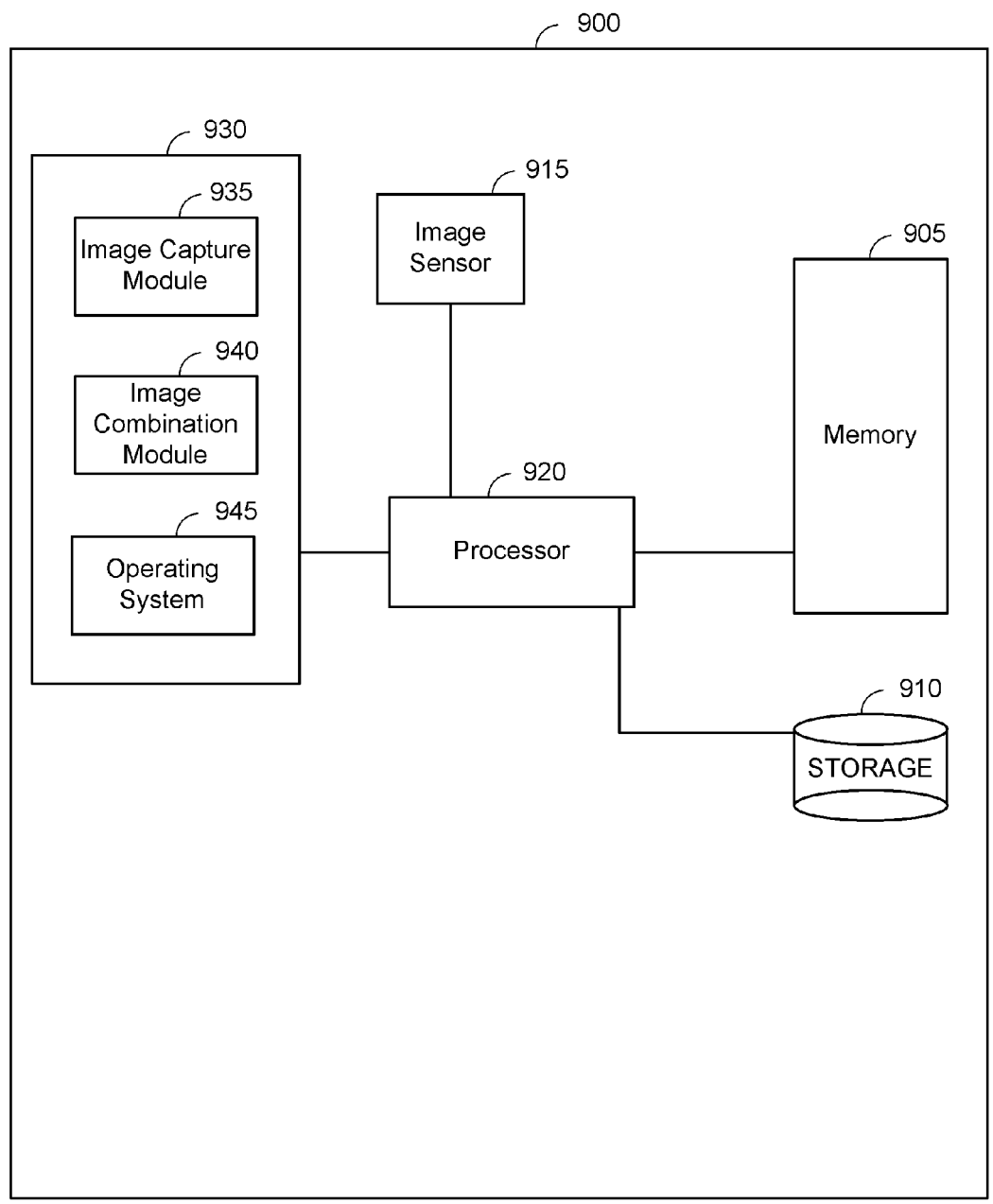
FIG. 9 depicts a high-level block diagram of a device having a set of components including a processor operatively coupled to an image sensor.

FIG. 9 depicts a high-level block diagram of a device 900 having a set of components including a processor 920 operatively coupled to an image sensor 915. A working memory 905, storage 910, and memory 930 are also in communication with and operative attached to the processor. Device 900 may be a device configured to take digital photograhs and/or videos, such as a digital camera, a cell phone, or another device. The image sensor 915 may be configured to capture a number of pixels of an image. Any number of such pixels may be included on the device 900. The pixels on an image sensor may be arranged in a number of rows and columns, in order to form a grid.

Processor 920 may be a general purpose processing unit or a processor specially designed for the disclosed methods. As shown, the processor 920 is connected to a memory 930 and a working memory 905. In the illustrated embodiment, the memory 930 stores image capture module 935, image combination module 940, and operating system 945. These modules include instructions that configure the processor to perform various tasks. Working memory 905 may be used by processor 920 to store a working set of processor instructions contained in the modules of memory 930. Alternatively, working memory 905 may also be used by processor 920 to store dynamic data created during the operation of device 900.

As mentioned above, the processor 920 is configured by several modules stored in the memories. For example, the image capture module 935 may include instructions that configure the processor 920 to capture one or more images using the image sensor 915. For example, the image capture module 935 may include instructions that configure the processor 920 to capture a first image with a first subset of pixels in image sensor 915, while simultaneously capturing a plurality of images with a second subset of pixels in image sensor 915. For example, this may allow a first image to be captured on the first subset of pixels using a first exposure length, while a plurality of images with a second exposure length, shorter than the first exposure length, are captured on the second subset pixels of image sensor 915.

The memory 930 may also contain an image combination module 940. The image combination module 940 may contain instructions that configure the processor 920 to receive signals from the image sensor 915, and combine a number of frames from the image sensor 915 into a single frame. In some aspects, the image combination module 940 may be configure to operate in parallel with the image capture module 935, in order to combine frames captured using an image capture process as described above.

Operating system module 945 configures the processor to manage the memory and processing resources of device 900. For example, operating system module 945 may include device drivers to manage hardware resources such as the image sensor 915 or storage 910. Therefore, in some embodiments, instructions contained in modules discussed above may not interact with these hardware resources directly, but instead interact through standard subroutines or APIs located in operating system component 945. Instructions within operating system 945 may then interact directly with these hardware components.

Processor 920 may write data to storage module 910. While storage module 910 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

FIG. 9 depicts a device having separate components to include a processor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 9 illustrates two memory components, to include memory component 930 having several modules, and a separate memory 905 having a working memory, one with skill in the art would recognize several embodiments utilizing different memory architectures. For example, a design may utilize ROM or static RAM memory for the storage of processor instructions implementing the modules contained in memory 930. Alternatively, processor instructions may be read at system startup from a disk storage device that is integrated into device 900 or connected via an external device port. The processor instructions may then be loaded into RAM to facilitate execution by the processor. For example, working memory 905 may be a RAM memory, with instructions loaded into working memory 905 before execution by the processor 920.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-9 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of capturing a high dynamic range image, comprising:
    capturing, on a first subset of pixels on an image sensor, a first image with a first exposure length;
    capturing, on a second subset of pixels on the image sensor, a plurality of images with a second exposure length, wherein the second exposure length is shorter than the first exposure length;
    combining the plurality of images with a second exposure length into a second image; and
    combining the first image and the second image to form a high dynamic range image.

2. The method of claim 1, wherein the first subset of pixels comprises a first plurality of pixel lines of a pixel array and wherein the second subset of pixels comprises a second plurality of pixel lines of the pixel array.

3. The method of claim 2, wherein the first plurality of pixel lines and the second plurality of pixel lines are interlaced with each other.

4. The method of claim 1, wherein the plurality of images comprises two images.

5. The method of claim 1, wherein the plurality of images comprises three images.

6. The method of claim 1, wherein the plurality of images are captured sequentially during the capturing of the first image.

7. An electronic device for capturing a high dynamic range image, comprising:
    a CMOS visible image sensor comprising a plurality of pixels including a first subset of pixels and a second subset of pixels; and
    a processor configured to:
        capture, on the first subset of pixels, a first image with a first exposure length;
        capture, on a second subset of pixels, a plurality of images with a second exposure length, wherein the second exposure length is shorter than the first exposure length;
        combine the plurality of images with a second exposure length into a second image; and
        combine the first image and the second image to form a high dynamic range image.

8. The electronic device of claim 7, wherein the first subset of pixels comprises a first plurality of pixel lines of a pixel array and wherein the second subset of pixels comprises a second plurality of pixel lines of the pixel array.

9. The electronic device of claim 8, wherein the first plurality of pixel lines and the second plurality of pixel lines are interlaced with each other.

10. The electronic device of claim 7, wherein the plurality of images comprises two images.

11. The electronic device of claim 7, wherein the plurality of images comprises three images.

12. The electronic device of claim 7, wherein the plurality of images are captured sequentially during the capturing of the first image.

13. An electronic device for capturing a high dynamic range image, comprising:
    means for capturing, on a first subset of pixels on an image sensor, a first image with a first exposure length;
    means for simultaneously capturing, on a second subset of pixels on an image sensor, a plurality of images with a second exposure length, wherein the second exposure length is shorter than the first exposure length;
    means for combining the plurality of images with a second exposure length into a second image; and
    means for combining the first image and the second image to form a high dynamic range image.

14. The electronic device of claim 13, wherein the first subset of pixels comprises a first plurality of pixel lines of a pixel array and wherein the second subset of pixels comprises a second plurality of pixel lines of the pixel array.

15. The electronic device of claim 14, wherein the first plurality of pixel lines and the second plurality of pixel lines are interlaced with each other.

16. The electronic device of claim 13, wherein the plurality of images comprises two images.

17. The electronic device of claim 13, wherein the plurality of images comprises three images.

18. The electronic device, of claim 13, wherein the plurality of images are captured sequentially during the capturing of the first image.

* * * * *